April 12, 1949.  J. W. MARTIN  2,466,994
FROZEN FOOD VEHICLE
Filed Jan. 22, 1947  2 Sheets-Sheet 1

INVENTOR.
James W. Martin
BY Darby & Darby
Attorneys.

April 12, 1949.                    J. W. MARTIN                    2,466,994
                              FROZEN FOOD VEHICLE
Filed Jan. 22, 1947                                           2 Sheets-Sheet 2

INVENTOR.
James W. Martin
BY Darby & Darby
Attorneys.

Patented Apr. 12, 1949

2,466,994

UNITED STATES PATENT OFFICE 2,466,994

FROZEN FOOD VEHICLE

James W. Martin, St. Petersburg, Fla.

Application January 22, 1947, Serial No. 723,502

9 Claims. (Cl. 62—13)

1

This invention relates to improvements in mobile refrigerated units such as trucks, railway cars and the like with special reference to refrigerated delivery trucks.

It is the present practice in the art of distributing frozen foods and the like to provide delivery trucks with heat insulated bodies forming a space which is refrigerated by means of any one of a number of refrigerating systems suitable for the purpose. The truck body is provided with one or more doors which are opened by the driver each time he makes a delivery. The refrigerated compartment sometimes comprises the entire interior of the insulated body provided with one or more doors so that the entire interior is accessible and at other times the truck body is divided into compartments each provided with a door through which access may be had to the interior. In some forms of refrigerated trucks the insulated body is arranged so that the driver may enter it. These various constructions have many defects and disadvantages.

For example, the frozen foods are supported loosely in the truck body arranged more or less in groups which is not conducive to easy and quick handling of the foods at the delivery points. The truck driver in making a delivery of a varied list of frozen foods must keep the door of the insulated body open for a reasonably long time or if he enters the truck body he must stay for a reasonably long time. In the former case the temperature of the truck rises rapidly, a heavy burden on the refrigerating system. In the latter case the truck driver is subjected to all the discomfort and ills of prolonged exposure to low temperature. In all cases the warm air entering the refrigerated space causes moisture to condense on the contents of the truck, producing wet, unsightly merchandise.

Another basic defect with this method of distributing frozen foods is represented by the undue amount of insulation which must be incorporated in the truck body in order to attain the desired low temperature. This insulation is represented by an unduly large wall thickness, thereby reducing the capacity of the truck as a transportation vehicle. In order to compromise with this difficulty, the tendency is to provide less than an adequate amount of insulation, thereby overloading the refrigerating equipment and under adverse conditions compromising with the required conditions by maintaining a higher than desired temperature within the truck body.

In addition to these defects there is an unreasonable delay in loading the trucks since an excessive amount of time is required to load and arrange a wide variety of frozen food items such as are now available.

It can be stated as planned objects of this invention to overcome all of these defects by means of the structure herein disclosed and comprising the subject matter of this invention.

One of the objects of the invention is to provide a refrigerated vehicle structure such that it may be quickly loaded.

Another object is to provide a loading and storing mechanism whereby a wide variety of frozen or chilled items can be arranged in classifications so that all packages of a particular food product are assembled at one point, facilitating the rapid selection of a varied list of items at the delivery point.

Another object of the invention is to provide a frozen food delivery truck provided with a refrigerated body maintained at a relatively high temperature with respect to the frozen food items contained therein, thus providing a warmer atmosphere in which the driver may operate, reducing the insulation thickness of the truck body thereby increasing its storage capacity and eliminating sweating of the frozen items when the warmer outside air enters the truck body.

Another object of the invention is to provide a structure whereby the actual spaces containing the frozen foods are confined and refrigerated to the desired low temperature.

Other and more detailed objects of the invention will be apparent from the following description of the embodiment thereof illustrated in the attached drawings.

This invention resides substantially in the combination, construction, arrangement, relative location of parts, steps and series of steps, all as herein disclosed.

In the accompanying drawings—

Figure 1:
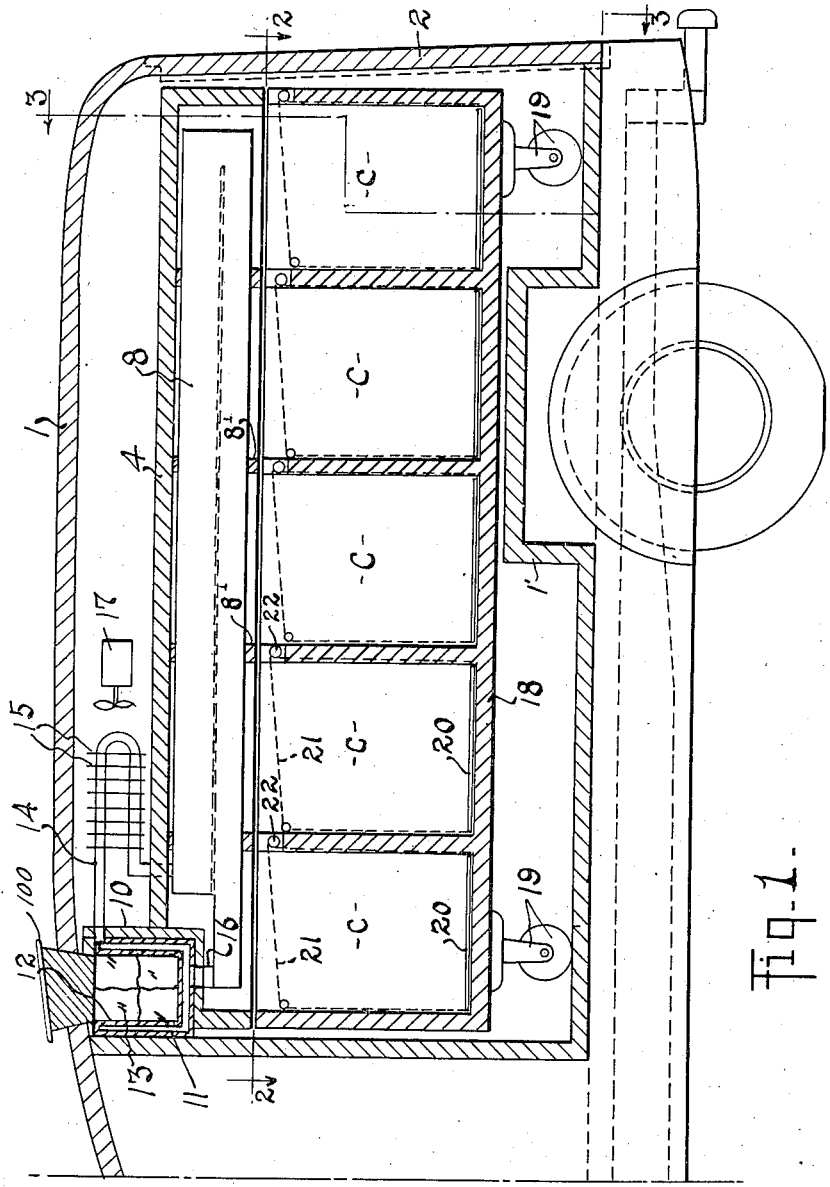
Figure 1 is a vertical longitudinal cross sectional view of one form of this invention taken on the line 1—1 of Figure 3.
Figure 2:
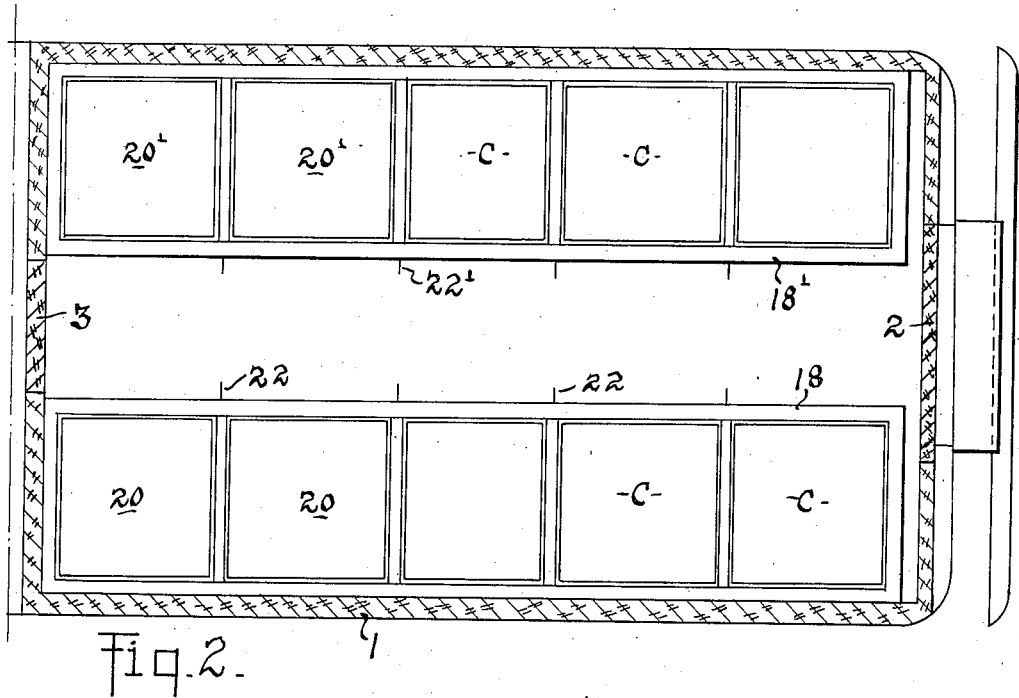
Figure 2 is a horizontal cross sectional view taken on the line 2—2 of Figure 1.

There is illustrated in the drawings a refrigerated light delivery truck, it being understood that the form and size can be varied without interfering with the subject matter of this invention. The truck includes a relatively lightly heat insulated body 1 having a rear door 2 through which the driver may enter it as well as a forward door 3 through which he may enter it if it is found desirable to provide this additional entry way. Mounted in the space formed by the body and as illustrated, along each side thereof near the top by any suitable means, not shown, are a pair of downwardly opening heat insulated hoods 4 and 5. These hoods are provided at longitudinally spaced points with transverse partitions as shown at 8' in Figure 1 for a purpose to be mentioned later and associated with each space resulting from these partitions are the hinged doors 6 and 7. Extending longitudinally of these hoods are the cooling plates 8 and 9 which can be of any suitable form such as, for example, the thin heat conducting hollow plates illustrated.

Figure 3:
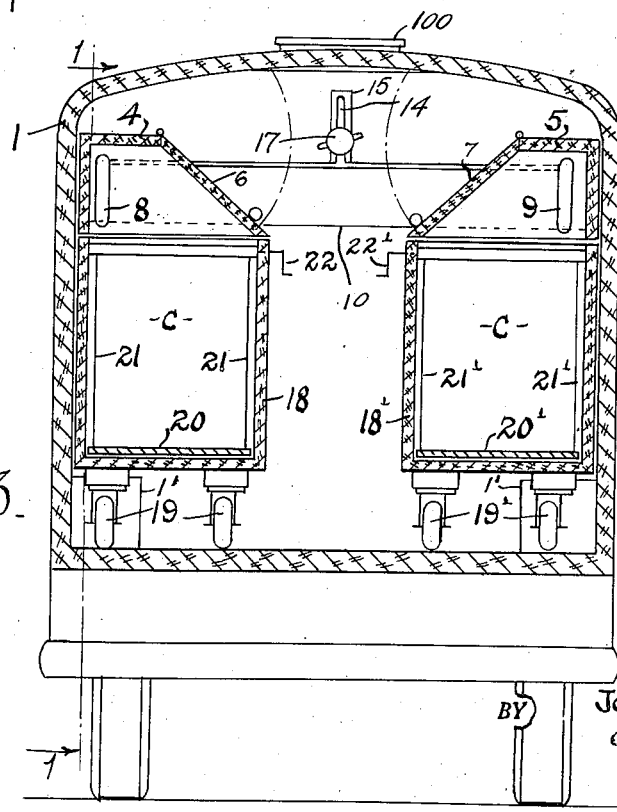
Figure 3 is a vertical transverse cross sectional view taken on the line 3—3 of Figure 1.

At 18 and 18' are heat insulated cabinets provided with casters or wheels 19. These cabinets are substantially equal to the length of the space formed by the heat insulated body 1 and are of sufficient height so that they can be rolled under the hoods 4 and 5, respectively, so that those hoods form substantially tight covers for them. The body 1 in the form of structure illustrated has two wheel housings 1' which project a short distance into the vehicle body as illustrated in Figures 1 and 3 but they do not of course extend as is clearly illustrated in Figure 3 any great distance transversely of the truck body. These cabinets are wheeled into the truck body through the door 2 and are provided with partition walls which will align with the partition walls 8', see Figure 1, so that there results a series of isolated food storage compartments C. The door 2 is of course wide enough to permit the cabinets being wheeled transversely of the truck body into alignment with the door opening and then pulled out of the truck body longitudinally. The wheel housings 1' are not wide enough to interfere with this operation which of course is possible when the structure is properly designed dimensionally. Each of these compartments is provided with a platform 20 which may be raised and lowered in any suitable manner as, for example, by means of cables 21 and crank operated shafts 22. As illustrated, this structure is associated with the cabinet 18 and the cabinet 18' is similarly provided with the platforms 20', cables 21' and crank operated shafts 22'. With this arrangement it is obvious that these trucks can be loaded at the warehouse or main distributing point ready for introduction into a delivery truck when needed. Items of similar kind can be individually stored in the compartment C so that all packages of a particular food product will be stored together and readily available for rapid selection to fill orders on varied numbers of various items.

The cooling plates 8 and 9 can be supplied with a refrigerated liquid from individual refrigerating sources or from a common refrigerating source. Referring to Figure 1, there is illustrated a type of refrigerating system which employs a solid ice such as solid carbon dioxide, water ice and the like. For example, blocks 13 of solid carbon dioxide are placed in a metal container 12 through the closure or hatch 100 which is nested within a similar container 11 to form a liquid space therebetween as shown. The bottom of this space is in communication with the plates 8 and 9 by means of the connections 16. The discharge ports in the plates 8 and 9 are connected to a cooling coil 14 provided with the heat absorbing fins 15 which coil and fins are exposed to the interior of the vehicle body. The discharge end of the coil 14 communicates with the space between the double walls 11 and 12. A motor driven fan 15 can be arranged to cause the air in the truck body to circulate over the coils and fins.

The many advantages of this arrangement will become apparent at once. Since the frozen foods are within the containers 18 and 18' they are protected from the heat of the outside atmosphere by the insulating walls of the truck body 1 and of the containers 18 and 18'. The space surrounding the containers 18 and 18' and their hoods 4 and 5, respectively, is maintained at a subatmospheric temperature (when the atmospheric temperature is substantially above 0° F.) which is not so low as to be uncomfortable to the driver when he enters it from the outside. On the other hand, this relatively cooler atmosphere serves as a barrier to the too rapid entry of heat into the compartments C which are maintained at the low temperatures necessary for frozen foods and the like. When the main doors 2 or 3 are opened any warm humid air that enters the truck body cannot cause condensation on the frozen food articles because they are not exposed to the air by reason of their confinement in the compartments C. By this arrangement it is possible to make the insulation of the truck body itself relatively light as will be apparent.

Another advantage of this arrangement as previously mentioned is that the truck body can be very rapidly loaded by simply wheeling in two of the wheeled containers. These containers can be packed at leisure at the warehouse under proper conditions.

When the driver desires to make an assorted selection of items he successively opens the doors 6 and 7, gaining access to the desired compartments C. If these compartments are well packed there is relatively little surface area of the frozen food packages to be exposed to any humidity in the atmosphere of the truck body. Further, because the items are all classified the driver can quickly extract the desired number of packages from a particular compartment C and close its associated door. This minimizes the chances of condensation and reduces the chances of warming that compartment. Of course, as is obvious, the top opening type of refrigerator is the one best suited to frequent opening since the cool atmosphere thereof is not easily displaced by the warmer air outside. As the level of the contents of each compartment C is lowered to a point where it is uncomfortable for the operator to reach in, he need only operate the associated crank shaft 22 to raise the remaining contents to an easily reached position.

As an example of the possibilities of such an arrangement, the temperature in the compartments C can easily be maintained in the neighborhood of 0° F. while the atmosphere in the truck body, even with frequent opening of the doors, can be maintained at 35 to 45° F. Obviously, since the lower temperatures are maintained in relatively confined spaces the refrigeration of those spaces can be effected with considerable saving in the total refrigeration required.

If the driver enters the truck body and immediately closes the door he can assemble a list of items in the relatively warmer atmosphere of the truck body without discomfort and without danger of condensation of moisture on the items abstracted from the compartments C. The atmosphere of the truck body will be and will remain relatively dry. As soon as his selection is complete, he can quickly remove it from the truck body and close the door. Thus, the sweating of the stored items is substantially prevented throughout the entire delivery route. This result can be enhanced by providing the truck body with dehydrating mechanism and by the use of the fan which causes circulation of the air in the body over the cooling coil 14 where the moisture in the air will be extracted.

Another advantage of this system is that a substantially constant load is placed upon the refrigerating equipment, an operating condition which is conductive to efficient operation.

It is also clear that the loading and unloading of the delivery truck is greatly facilitated by this mechanism thereby increasing the delivery capacity of the truck, a desirable economic factor.

It may be noted that the particular refrigerating system shown in the drawings is for illustrative purposes only since it is obvious that a wide variation in the details of its construction is possible in accordance with various well known refrigerating systems.

From the above description it will be apparent to those skilled in the art that the substance of this invention is capable of use in many forms and I do not desire therefore to be limited to the illustrative example herein given. The protection sought is defined by the appended claims.

What is claimed is:

1. A refrigerated distributing vehicle including an insulated housing forming the body thereof having an entrance opening, a door for said opening, a heat insulated hood mounted in said housing above the level of the floor, a movable cabinet mounted under said hood to form therewith a substantially closed compartment, a source of refrigeration in said housing and a cooling coil connected thereto having a portion disposed in said housing and a portion in said hood.

2. In the combination of claim 1, said cabinet having wheeled supports whereby it may be moved into and out of said housing through said housing opening.

3. In the combination of claim 1, said cabinet having partitions forming a plurality of compartments, a platform in each of said compartments and means for individually raising and lowering said platforms.

4. In a refrigerated transportation vehicle, the combination including a heat insulated vehicle body having an entrance opening, a door for closing said opening, a pair of heat insulated hoods mounted lengthwise of said body along the sides thereof in a plane above the floor level, a pair of movable cabinets in said body disposed under said hoods to form therewith substantially closed compartments, a source of refrigeration in said housing and cooling coils connected to said source having portions mounted within said hoods and at least one portion exposed to the atmosphere of said housing.

5. In the combination of claim 4, said cabinets being partitioned to subdivide said compartments and said hoods having doors for individual access to said compartments.

6. A refrigerating system comprising an insulated truck body housing, means forming a heat insulated cabinet in said housing and refrigerating means for maintaining refrigerated atmospheres in said housing and cabinet at different temperatures, said means forming a heat insulated cabinet including a removable heat insulated container.

7. A refrigerating system comprising an insulated truck body housing, means forming a heat insulated cabinet in said housing and refrigerating means for maintaining refrigerated atmospheres in said housing and cabinet at different temperatures, said means forming a heat insulated cabinet including a portable container bodily removable from said housing, a platform in said container and means for raising and lowering said platform.

8. A refrigerating system comprising an insulated truck body housing, means forming a heat insulated cabinet in said housing and refrigerating means for maintaining refrigerated atmospheres in said housing and cabinet at different temperatures, said means forming a heat insulated cabinet comprising a container and a hood fixed in said housing, said container being removably positioned under said hood to form therewith a substantially closed cabinet.

9. A refrigerating system comprising an insulated truck body housing, means forming a heat insulated cabinet in said housing and refrigerating means for maintaining refrigerated atmospheres in said housing and cabinet at different temperatures, said means forming a heat insulated cabinet comprising a removable container, a hood fixed in said housing, said container being positioned under said hood to form a substantially closed cabinet, and a movable closure forming part of said hood to permit access to said container.

JAMES W. MARTIN.

REFERENCES CITED

The following references are of record in the file of this patent:

UNITED STATES PATENTS

| Number | Name | Date |
|---|---|---|
| 1,340,853 | Serwe et al. | May 18, 1920 |
| 1,506,103 | Wishart et al. | Aug. 26, 1924 |
| 1,889,686 | McKee | Nov. 29, 1932 |
| 1,890,888 | Sherman | Dec. 13, 1932 |
| 1,966,164 | Clark | July 10, 1934 |
| 2,068,435 | Rutishauser | Jan. 19, 1937 |
| 2,069,481 | Rott | Feb. 2, 1937 |
| 2,096,256 | Mitchell | Oct. 19, 1937 |
| 2,125,205 | Snowden | July 26, 1938 |
| 2,330,339 | De More | Sept. 28, 1943 |

FOREIGN PATENTS

| Number | Country | Date |
|---|---|---|
| 279,754 | Great Britain | Nov. 3, 1927 |
| 420,535 | Great Britain | Dec. 3, 1934 |